United States Patent [19]

Allaben, Jr.

[11] 4,151,755

[45] May 1, 1979

[54] POWER TRANSMISSION BELT

[75] Inventor: Charles M. Allaben, Jr., Ithaca, N.Y.

[73] Assignee: Borg-Warner Corporation, Chicago, Ill.

[21] Appl. No.: 803,702

[22] Filed: Jun. 6, 1977

[51] Int. Cl.² ............................................. F16G 1/00
[52] U.S. Cl. ................................................. 74/231 P
[58] Field of Search ............... 74/231 P, 231 R, 233, 74/234, 232, 237

[56] References Cited

U.S. PATENT DOCUMENTS 2,189,049  2/1940  Ungar ........................................ 74/233
4,052,909  10/1977  Warner et al. ...................... 74/231 P

FOREIGN PATENT DOCUMENTS 1176766  4/1959  France ...................................... 74/231

Primary Examiner—Leonard H. Gerin
Attorney, Agent, or Firm—Aubrey L. Burgess

[57] ABSTRACT

An endless power transmission belt having a reinforcing and tension member, such as a cord or cloth strip, and lateral stiffening means comprising perforated hollow members are incorporated into an elastomer body. Such belt is especially adaptable for transmitting power in variable pulley drives and the like.

7 Claims, 4 Drawing Figures

POWER TRANSMISSION BELT

BACKGROUND OF THE INVENTION

Power transmission belts comprising an elastomeric body reinforced with one or more helical winds of a cord, such as fiber glass and the like treated to bond to the elastomer to thus form a tension member are well known in the art. Some belts also include members to provide lateral stiffness to the belt while permitting longitudinal flexibility thereto when used to transmit power especially in variable pulley drives in which the belt performs its power transmission function by engaging the pulley flanges with its edges. In the absence of the stiffeners, belts especially when used in variable pulley drives sag in the middle, become arched and distorted. This is considered to be undesirable and is to be avoided. Examples of belts with lateral stiffening means are described in U.S. patents to Unger and Redmond, U.S. Pat. Nos. 2,189,049 and 3,772,929, respectively.

THE INVENTION

The power transmission belt of this invention is especially adaptable for variable speed drives, for example those using variable pulleys and has flexible, longitudinal tension-reinforcing members and transverse or lateral, prefabricated hollow perforated stiffening members which can be used as sprues in a belt molding process. In the finished belt, the stiffeners are filled with the elastomeric material. The stiffeners support the reinforcing cord to thus prevent the cords in the middle of the belt from sagging toward the center of the pulley which would place an excessive load on the edge cords. Thus the stiffeners must be as close to the cords as is possible with little elastomeric material between the cords and the stiffeners.

The stiffeners may be hollow members of substantially equal diameter or may be of larger dimensions in the central part so as to be tapered from the center to the edges. In the construction, any bending of the stiffeners will tend to maintain the cords at the same radius as the belt travels around a pulley and thus each cord will share loads equally. The cross-sections of the stiffeners may be circular, oval, rectangular, triangular or other shape.

Also, the outer surface of the stiffener part may be ribbed to provide guides for equal cord spacing.

THE DRAWINGS

DETAILED DESCRIPTION

Figure 1:
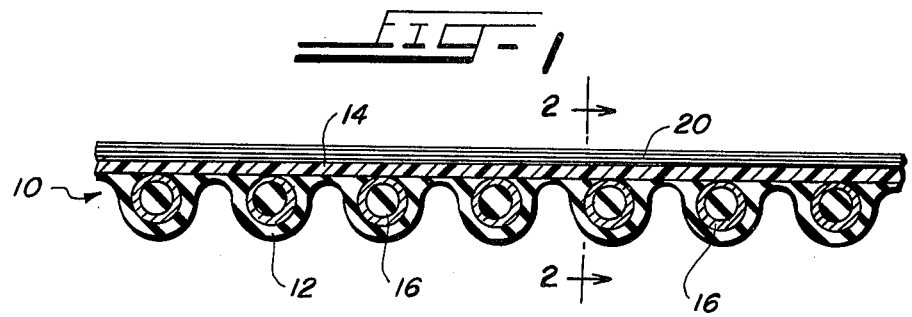
FIG. 1 is a longitudinal sectional view taken on line 1—1 of FIG. 2 of a portion of a belt according to this invention.
Figure 2:
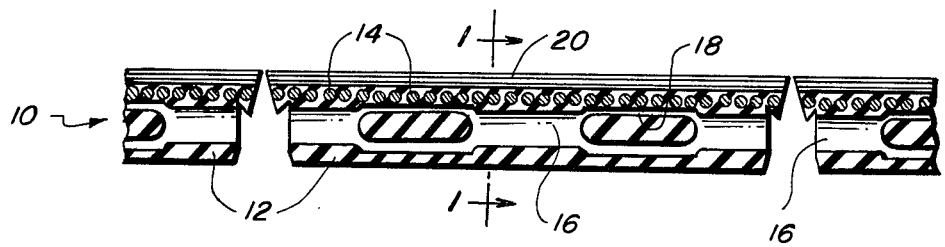
FIG. 2 is a transverse section taken on line 2—2 of FIG. 1 through a multiple width of belts of the FIG. 1 embodiment.

Looking now at the drawings and especially FIGS. 1 and 2, there is illustrated a belt 10 which comprises an elastomer body 12 of rubber, synthetic rubber and the like with a tension member 14 comprising, for example, a helical wind of cord or a cloth and a plurality of substantially evenly spaced transverse hollow stiffening members 16. The cord tension member may be of fiber glass strands treated and/or coated to adhere to the elastomer of the body 12, while the stiffeners are generally tubular members perforated as at 18. The perforations or openings 18 are filled with elastomer. Preferably, the cord and the stiffeners are closely adjacent one another with little if any elastomeric material immediately therebetween. The stiffeners may be of metal, phenolic, a thermosetting plastic, hard rubber or a composite such as fiber glass reinforced material and the like. They may be cylindrical, elliptical, triangular or other cross-sectional shape so long as they can function to provide the lateral stiffeners to the product and function as sprues in the manufacturing process. One surface of the belt may be covered with a fabric 20, such as nylon, a common expedient in the belt art; the other surface may be cogged, as illustrated or other configurations, as desired. The fabric, if used, is chosen or treated to adhere to the elastomer of the belt body.

Figure 3:
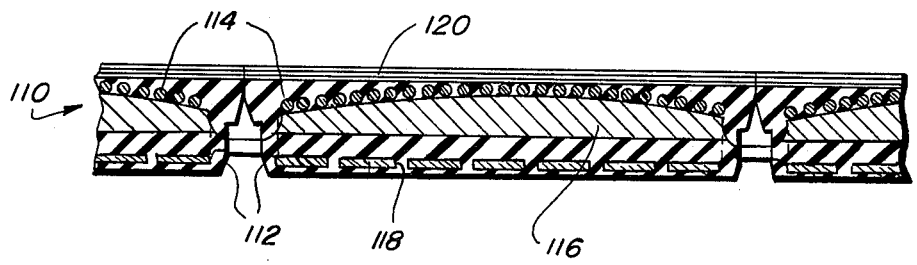
FIG. 3 is a view similar to FIG. 2 through a multiple width of belts and through the stiffeners of another embodiment.

FIG. 3 illustrates another embodiment of the invention in which a belt 110 comprises an elastomeric body 112 of rubber, synthetic rubber and the like with a tension member 114 comprising, for example, a helical wind of a cord or a cloth and a plurality of substantially evenly spaced transverse stiffening members 116. The cord tension member may be of fiber glass strands heated and/or coated to adhere to the elastomer of the body 112, which the stiffeners are generally tubular members perforated as at 118. The belt may be covered with a fabric 120 and the other shaped as described with reference to FIG. 1. The stiffeners 118 may be of the same sectional shape and of the same material as described for FIG. 1; however they are of tapered configuration, larger centrally than at the ends of a belt width. As stated any bending of the stiffeners will tend to maintain the cords at the same radius as the belt travels around a pulley so that each cord will equally share the load.

Figure 4:
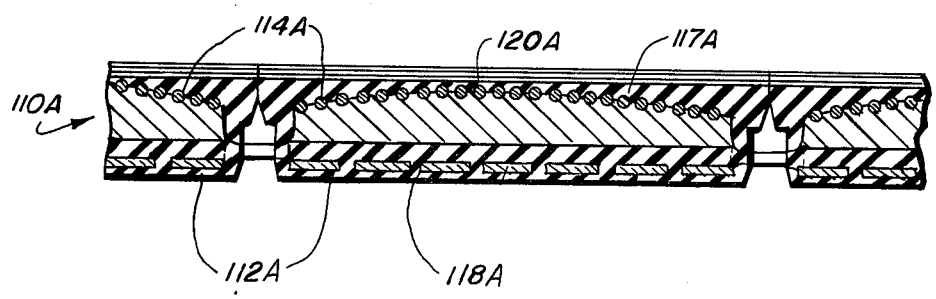
FIG. 4 is a view similar to FIG. 3 through a multiple width of belts of still another embodiment.

FIG. 4 illustrates another embodiment of the invention in which the same reference characters (with the suffix A) are used as in the FIG. 3 embodiment; the difference being that the stiffeners 116A are ribbed as at 117, thus providing guides to insure equal spacing of the cords 114. The stiffeners may be of equal section or tapered, as is desired.

What is claimed is:

1. A power transmission belt comprising:
   an elastomer body;
   longitudinal tension-reinforcing means in said body; and
   perforated generally tubular transverse stiffening means in said body substantially filled with elastomer.

2. A power transmission belt as in claim 1 wherein said stiffening means are metal.

3. A power transmission belt as in claim 1 wherein said stiffening means are plastic.

4. A power transmission belt as in claim 3 wherein said plastic is thermosetting.

5. A power transmission belt as in claim 1 in which said stiffening means are of substantially uniform cross-section from end to end.

6. A power transmission belt as in claim 1 in which said stiffening means are of varying cross-section from end to end.

7. A power transmission belt as in claim 1 in which said stiffening means are ribbed along the length thereof.

* * * * *